United States Patent [19]
McCann

[11] Patent Number: 5,144,312
[45] Date of Patent: Sep. 1, 1992

[54] LOCATING SYSTEM

[75] Inventor: John D. McCann, Steventon, United Kingdom

[73] Assignee: United Kingdom Atomic Energy Authority, London, England

[21] Appl. No.: 553,253

[22] Filed: Jul. 9, 1990

[30] Foreign Application Priority Data

Jul. 22, 1989 [GB] United Kingdom ............... 8916815

[51] Int. Cl.$^5$ ........................ G01S 13/74; G01S 5/02
[52] U.S. Cl. ........................................ 342/42; 342/453
[58] Field of Search ............... 342/450, 453, 465, 125, 342/42, 46, 126

[56] References Cited

U.S. PATENT DOCUMENTS

| | | | |
|---|---|---|---|
| 2,821,704 | 1/1958 | O'Day | 342/126 X |
| 3,412,399 | 11/1968 | Chisholm | 342/46 X |
| 3,611,379 | 10/1971 | Deckett | 342/46 X |
| 3,864,662 | 2/1975 | David et al. | 342/46 X |
| 4,011,562 | 3/1977 | Bruce | 342/46 |

FOREIGN PATENT DOCUMENTS 2226730 7/1990 United Kingdom .

Primary Examiner—Gilberto Barron, Jr.
Attorney, Agent, or Firm—William R. Hinds

[57] ABSTRACT

A system for locating a transponder (10) to an accuracy of plus or minus about 10 m in an area about 5 km across includes a master station (12) and two slave stations (14, 16) at known positions. The transponder and the two slaves each incorporates an electronic flywheel circuit and means to bring it into synchronism with a synchronizing signal from the master station. After a preset delay the transponder then transmits a radio signal to be received by the slave stations and by the master station, the time of receipt of which is measured at each. From these times the location of the transponder (10) is determined by a computer (18).

8 Claims, 3 Drawing Sheets

LOCATING SYSTEM

This invention a system by which a transponder within a defined area may be located and to a transponder for use in the system.

The transponder might be carried by an object, which might be a person or an animal, or a vehicle, or a ship for example. In a situation where the object is known to be somewhere in a defined area, for example a circular area of diameter 5 km, the system enables the position of the object to be ascertained, and hence enables his or its movements to be tracked. It is desired to find the position within an accuracy of plus or minus about 10 m. Known approaches to solving this problem are of two types: the most usual approach has been by taking bearings, either from two fixed base positions towards the object (which may in this case carry a radio transmitter), or from the object towards two fixed base positions (which may also comprise radio transmitters). Particularly with an automatic system it is difficult to measure the bearings accurately enough to achieve the desired positional accuracy since an accuracy of 0.1 degrees would be needed. An alternative approach is to measure the distances from the object to two fixed base positions; where this is performed by measuring the time for signals to propagate those distances it is again difficult to achieve the desired accuracy because of the difficulty in synchronising clocks at the object and at the base stations.

According to the present invention there is provided a system for locating a transponder within a defined area, the system comprising a base station and two spaced-apart slave stations at known locations., the transponder and at least those slave stations remote from the base station each incorporating a means to receive signals transmitted from the base station, an electronic flywheel circuit, and a means to bring the flywheel circuit into synchronism with the received signal from the base station, the signal from the base station being modulated at the frequency of the flywheel circuitry, the transponder also incorporating means to transmit a radio signal modulated at the frequency of the flywheel circuit at a predetermined time interval after receipt of the said signal from the base station, the time interval being set by reference to the flywheel circuit of the transponder, and each slave station incorporating means to receive the radio signal from the transponder and to determine by reference to the flywheel circuit of the respective slave station the time of receipt thereof, the system also including means to determine from the known locations of the base station and the two slave stations and from the times of receipt of the radio signal from the transponder the location of the transponder.

The use of the flywheel circuits enables the synchronisation to be performed to the desired accuracy. The signals from the base station are preferably radio signals, although other means such as optical fibre links may be used to transmit signals from the base station to the slave stations.

Desirably each flywheel circuit incorporates a close tolerance, well buffered crystal oscillator. In the preferred embodiment the oscillator is a 100 MHz crystal oscillator arranged to run continuously, whose output is connected via a gate to a divider unit. The divider unit is desirably chosen so the output frequency i.e. the flywheel frequency is less than the reciprocal of the largest possible signal propagation time (i.e. twice the propagation time for the signal from the base station to the transponder with the transponder as far as it can be from the base station), which ensures there is no ambiguity in the detected phase difference, and so the time of receipt.

There may be more than two slave stations, one of which may be at the base station, or be incorporated into the base station. Preferably a slave station incorporated into a base station comprises all the features of those slave stations remote from the base station.

The invention also provides a transponder for use in the system.

The invention will now be further described by way of example only and with reference to the accompanying drawings in which.

Figure 1:
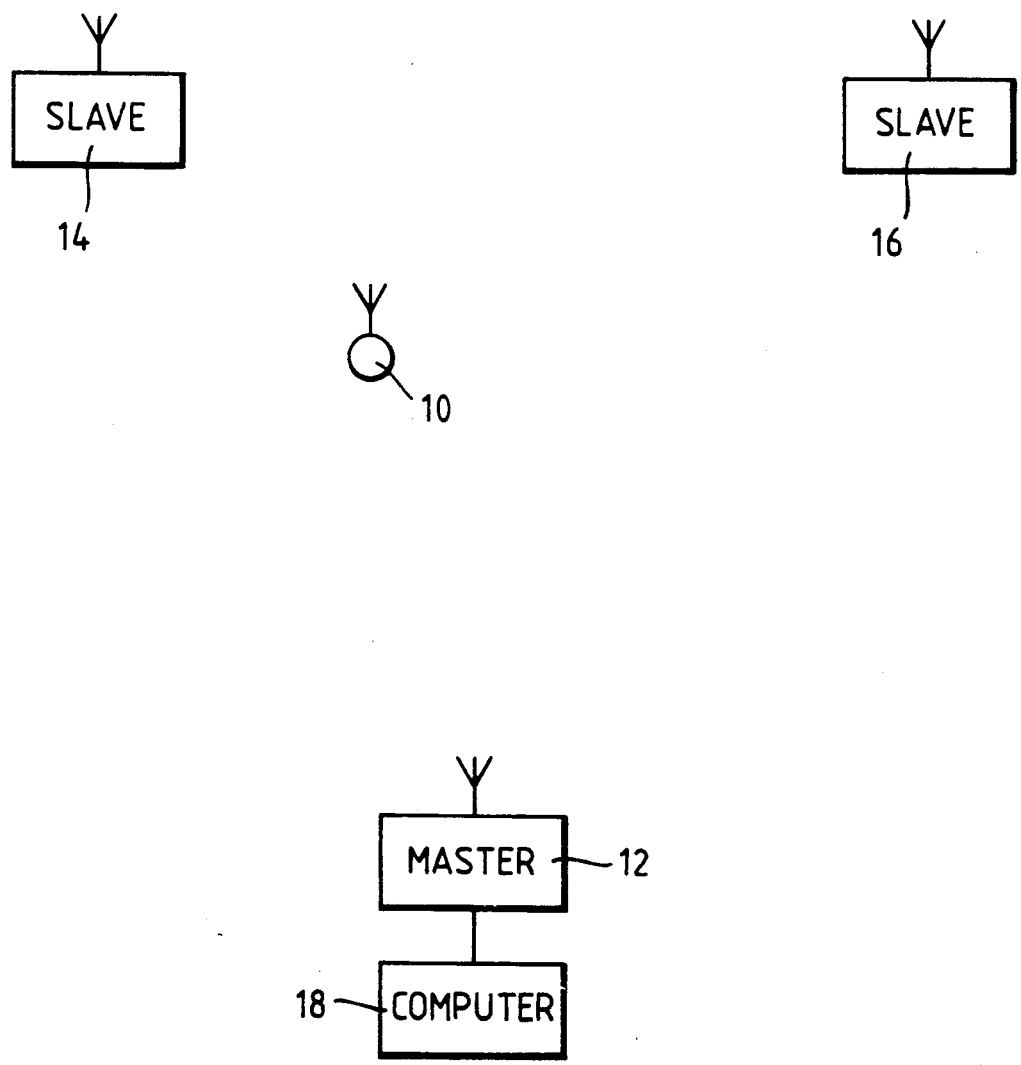
FIG. 1 shows a diagrammatic plan view of a locating system.

Referring to FIG. 1 there is shown a plan view of an area about 5 km across, in which is at least one mobile transponder 10 with an aerial whose location is to be determined. A master station 12 and two slave stations 14 and 16, each with an aerial, are arranged in the area at known positions which in this case are approximately at the corners of an equilateral triangle of side 4 km. The location of the transponder 10 is determined by a computer 18 from measurements of the propagation times for radio signals between the master station 12, the transponder 10, and the slave stations 14, 16, as described in more detail later. In the position of the transponder 10 shown in the Figure the propagation time from the master station 12 to the transponder 10 and on to the slave 14 will be about 14 microseconds, and if the location is to be determined to within ten meters then the times must be accurate to about 30 nanoseconds; this necessitates synchronisation of the timing systems to an even greater accuracy. Furthermore the effect of any delay in the transponder 10 switching between receiving and transmitting on the measurement must be minimized.

The master station 12, the transponder 10 and each slave station 14 and 16 includes a close tolerance well-buffered crystal oscillator, each oscillator being accurately set to oscillate at 100 MHz; by means of a dividing network which divides by 3200 a square-wave output frequency of 31.25 kHz can be generated in each. This frequency is suitable for this embodiment because its period, 32 microseconds, is greater than the radio signal total propagation time with the transponder 10 at the remotest part of the area; timing ambiguities are therefore prevented. In each case the oscillator oscillates continuously, but between the oscillator and the divider network is a gate which is closed when no output signal is required. Each also includes a radio frequency (1300 MHz) generator; when a radio signal is transmitted by the master station 12 or by the transponder 10 this 31.25 kHz square wave is transmitted as a wide-band frequency modulation (plus or minus 100 kHz) on this radio frequency carrier. The radio frequency generators, and frequency modulators (and demodulators, whereby signals can be received) are of known types and are not shown. The oscillators and dividing networks in the transponder 10 and the slave stations 14 and 16 form parts of respective flywheel circuits described in detail later with reference to FIG. 2 or FIG. 3; these circuits enable the respective 31.25 kHz output signals to be brought rapidly into phase with a signal received from the master station 12. The master station also incorporates such a flywheel circuit (separate from its master oscillator), which is synchronised with the signal being transmitted in the same manner.

In operation of the locating system, in the initial state the transponder 10 and the two slave stations 14 and 16 are set up to receive radio signals from the master station 12. To initiate operation the master station 12 transmits a train of sixteen cycles of the square wave 31.25 kHz signal, and then switches into the receive mode. This square wave signal is received by the transponder 10 and the two slaves 14, 16, and in each the flywheel circuit is brought into phase with this received signal; when the signal from the master station 12 ends, these flywheel circuits continue to generate output signals at 31.25 kHz. The transponder 10 then switches over to the transmit mode, and after waiting sixty four cycles of the output signal, transmits sixteen cycles of the square wave output signal. This square wave signal from the transponder 10 is received by the master station 12 and by the two slaves 14 and 16, and is compared with the locally-generated square wave output signal from the respective flywheel circuit, the time difference being measured for each of the sixteen cycles. The time differences are determined by counting pulses derived from the 100 MHz crystal oscillator between corresponding parts of the two square waves. After a total of one hundred and twenty eight cycles each of the flywheel circuits is gated to stop.

Since the positions of the master 12 and of the slaves 14, 16 are known, the time differences (which represent the total propagation times: from master to transponder and back; or from master to transponder and on to a slave minus the direct propagation time from the master to that slave) enable the position of the transponder 10 to be determined. The time differences measured by the master station 12 are transmitted to the computer 18; any obviously incorrect values can be ignored, and the average determined for the remainder. The time differences measured by the two slave stations 14 and 16 are transmitted by radio back to the master station 12, and hence to the computer 18, using the same carrier frequency as before, but using a narrow frequency band data link, this transmission being triggered by receipt at the respective slave station 14 or 16 of a corresponding command signal from the master station 12.

The computer 18 then determines the location of the transponder 10. This information may be merely stored, or plotted on a map of the area. Alternatively the location, or data relating to that location and previously recorded in the computer memory, may be transmitted by a similar data link to the transponder 10, to be displayed to an operator.

It will be appreciated that the system might be used to determine the locations of several transponders 10 within the area, the transponders being activated one at a time. In this case operation of the system would be initiated by the master station 12 using the data link to transmit the address of a specific transponder, i.e. a code to identify it. Thereafter operation would be just as described above. The same procedure would then be followed for each of the other transponders in the area.

It should be understood that the square wave 31.25 kHz signal transmitted by the master station 12, during which the flywheel circuits in the transponder 10 and the slaves 14, 16 are brought into phase with the received signal, might be transmitted for a different number of cycles, for example eight or thirty two cycles. The number of cycles of the flywheel taken by the transponder 10 to change over from receiving to transmitting might differ from the value sixty four stated above. The number of cycles of the flywheel after which each flywheel circuit is gated to stop might also differ from the value stated above, for example it might be one hundred and sixty cycles. It will also be appreciated that the radio signals might be transmitted at a different radio frequency, though desirably above 100 MHz; that the signals might be transmitted by amplitude-modulation rather than frequency-modulation; and that the 31.25 kHz signal might be transmitted as a sinusoidal signal, to be converted into a square wave signal after receipt.

Figure 2:
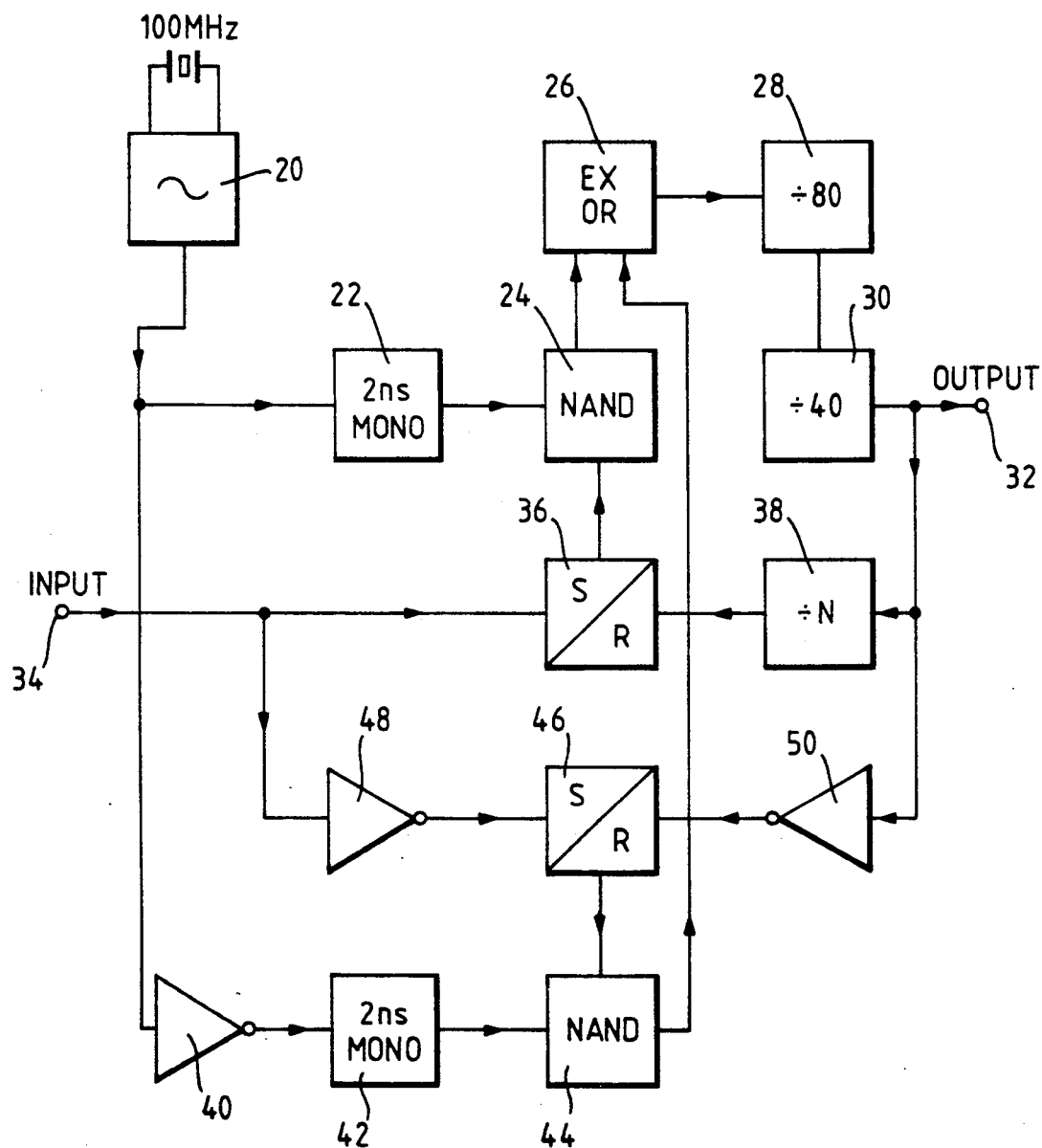
FIG. 2 shows a block circuit diagram of a flywheel circuit for use in the system of FIG. 1.

Referring to FIG. 2, this shows as a block diagram a flywheel circuit which as mentioned earlier may be used in the transponder 10, the master station 12 and in the slave stations 14 and 16 of the locating system. The flywheel circuit comprises a close tolerance well-buffered crystal oscillator 20 which oscillates at an accurate frequency of 100 MHz. A sinusoidal signal from the oscillator 20 is supplied to a monostable 22 which gives an output pulse of duration 2 ns once every cycle; these pulses are supplied via a NAND gate 24 and an Exclusive OR gate 26 to a high speed divider unit 28 to provide a square-wave output at an eightieth of the pulse frequency, and then to another divider unit 30 to provide a square-wave output at a fortieth of the frequency supplied to it. An output signal is thus generated at a frequency of 31.25 kHz at an output terminal 32.

The synchronising 31.25 kHz square wave signal received from the transmitter of the master station 12 (after demodulation) is supplied to an input terminal 34 of the circuit, and thence to the set input of a set/reset unit 36 whose reset terminal receives signals from the output terminal 32 via a divide-by-one-hundred-and-twenty-eight unit 38. The output signal from the set/reset unit 36 is supplied to the NAND gate 24.

Hence when the rising edge of the first cycle of the 31.25 kHz synchronising signal is received at the input terminal 34, the output signal from the set/reset unit 36 opens the NAND gate 24 so the sequence of 2 ns pulses passes through the divider units 28 and 30, and so generates an output signal which is also at 31.25 kHz. The output signal is produced for one hundred and twenty eight cycles, when a reset signal closes the NAND gate 24. (It may be noticed that the signals from the NAND gate 24 to the exclusive OR gate 26 are a series of negative pulses, but since for almost the entire time the signal supplied to the other input of the exclusive OR gate 26 is positive the output from the exclusive OR gate 26 is a series of positive pulses synchronised with the negative pulses received from the NAND gate 24). It will be appreciated that the output signal 32 should be exactly in phase with the input signal 34, but due to delay in operation of the set/reset unit 36 the output signal may start slightly late and so lag.

The sinusoidal signal from the oscillator 20 is also supplied, via an inverter 40, to a monostable 42 which gives an output pulse of duration 2 ns once every cycle (in antiphase to those supplied by the monostable 22). These pulses are supplied to a NAND gate 44 whose output is supplied to the second input of the exclusive OR gate 26. The gate 44 is opened by a signal from a set/reset unit 46 whose set input is connected via an inverter 48 to the input terminal 34, and whose reset input is connected via an inverter 50 to the output terminal 32.

The NAND gate 44 is consequently opened by the falling edge of the 31.25 kHz synchronising signal, and is closed by the falling edge of the 31.25 kHz output signal. The time for which it is open thus represents the time that the output signal lags behind the synchronising signal. While the NAND gate 44 is open the exclusive OR gate 26 is supplied with additional pulses which are midway between the pulses from the NAND gate 24. These additional pulses enable the output signal to catch up with the synchronising signal, so that before the sixteen cycles have finished they are exactly synchronised.

Figure 3:
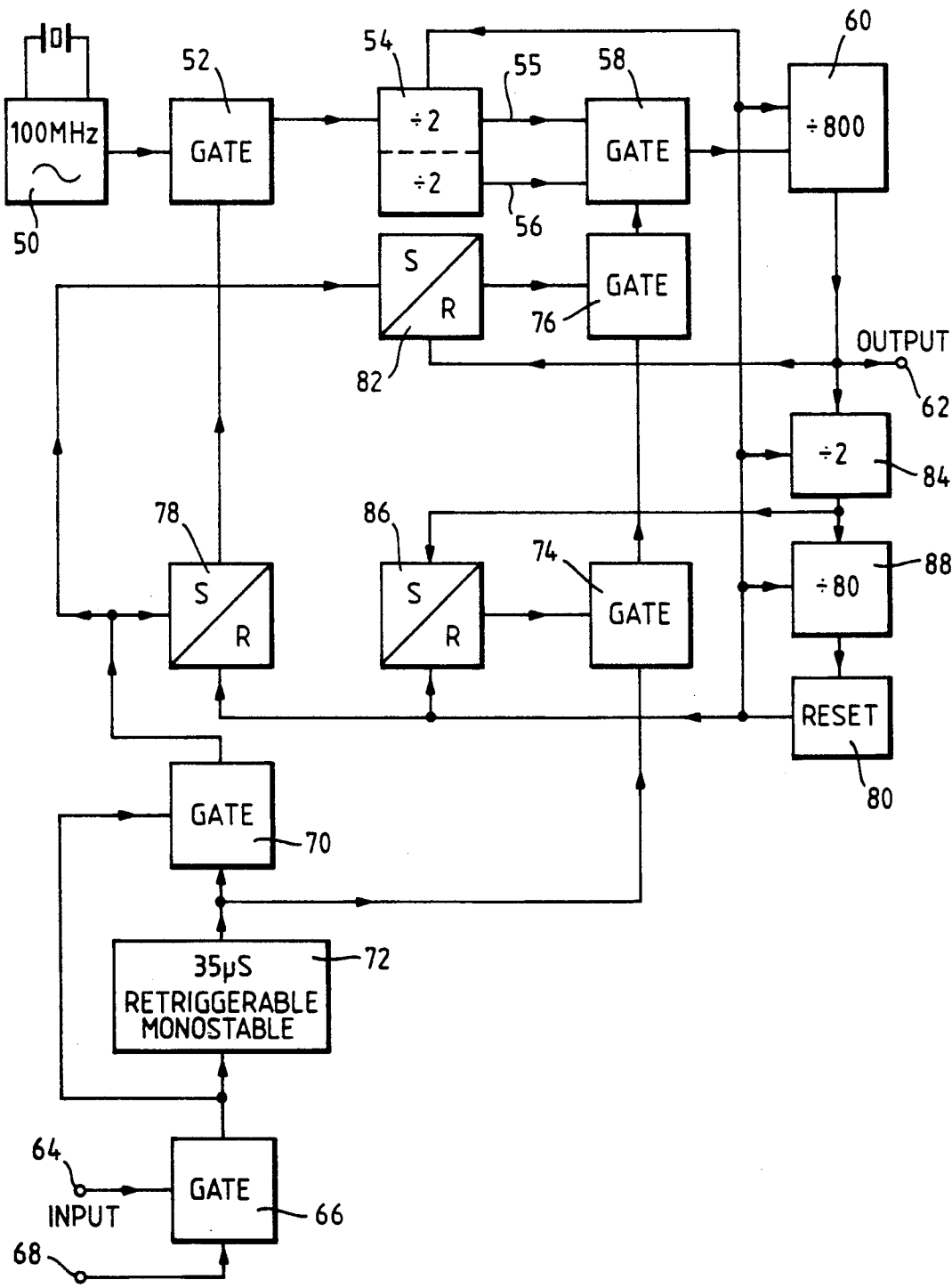
FIG. 3 shows a block circuit diagram of an alternative flywheel circuit for use in the system of FIG. 1.

It will be appreciated that the flywheel circuit described above is only by way of example, and that the locating system might incorporate a different design of flywheel circuit. One such alternative design is shown in FIG. 3, to which reference is now made. The flywheel circuit of FIG. 3 does not require ultra short mono-stable circuits or exceptionally fast gates, and so uses less electrical power than the circuit of FIG. 2. The flywheel circuit of FIG. 3 includes a close tolerance well-buffered crystal oscillator 50 which oscillates at an accurate frequency of 100 MHz when the circuit is energised. The sinusoidal output signal from the oscillator 50 is supplied via a gate 52 to provide a square-wave signal to two successive high-speed binary dividers 54 providing two outputs 55 and 56 (corresponding to division by two and four respectively). These outputs 55 and 56 are supplied via a gate 58 to a divide-by-eight-hundred unit 60 whose output signal is provided to an output terminal 62. If the circuit is producing an output in the absence of a reference signal, the gate 58 supplies the signals from output 56 to the unit 60, so that the overall division ratio is 3200. Hence the signal at the output terminal 62 has a frequency of 31.25 kHz.

The synchronising 31.25 kHz square wave reference signal received from the transmitter of the master station 12 (after demodulation) is supplied to an input terminal 64 of the circuit connected to a gate 66, to which is also supplied a signal indicating if the received signal strength is greater than a preset threshold and is interference free, via a terminal 68. The output from the gate 66 is supplied to a gate 70 and also to a retriggerable monostable 72 whose timeout period is 35 microseconds, that is about ten percent more than the period of the reference signal. The output from the monostable 72 is connected to both the gate 70 and to a gate 74 connected via a gate 76 to the gate 58.

The output from the gate 70 is supplied to the set input of a set/reset unit 78 whose reset input receives signals from a master reset unit 80 described later. The output from the unit 78 controls the gate 52. The output from the gate 70 is also supplied to the set input of a set/reset unit 82 whose reset input receives signals from the output terminal 62. The output from the unit 82 controls the gate 76.

The output terminal 62 is also connected via a divide-by-two unit 84 to the set input of a set/reset unit 86 whose reset input receives signals from the master reset unit 80. The output of the unit 86 controls the gate 74. The output of the unit 84 is connected via a divide-by-eighty unit 88 to the master reset unit 80. The reset unit 80 provides a reset signal to the set/reset units 78 and 86 and to each of the divider units 54, 60, 84 and 88 when the circuit is initially energised, and after one hundred and sixty cycles of the output signal 62 have been generated. The gates 52 and 74 are hence closed as a result of this reset signal.

Hence when the rising edge of the first cycle of a 31.25 kHz synchronising signal of adequate signal strength is received at the input terminal 64 the monostable 72 will be triggered, and its output will remain at the on level until after receipt of the last cycle, as it will be retriggered by each cycle. The square wave synchronising signal is therefore supplied through the gate 70, so setting the set/reset unit 78 and opening the gate 52. Signals from the oscillator 50 can therefore reach the divider unit 54, and a corresponding square wave 31.25 kHz signal is therefore generated at the output terminal 62.

At the start of the second cycle of the output signal 62 the divide-by-two unit 84 will provide a signal to set the unit 86 and open the gate 74, so the steady signal from the monostable 72 is supplied to the gate 76. The duration of the output signal from the set/reset unit 82 is proportional to the phase difference between the reference synchronising signal and the generated signal at the output 62 (being equal to the time between the end of a cycle of the reference signal and the end of a cycle of the generated signal). After the first cycle of the generated signal, therefore, a control signal is supplied to the gate 58 of the same duration as the output signal from the set/reset unit 82 to cause the gate 58 to pass signals from output 55 instead of output 56. During this period the frequency at which pulses are supplied to the divider unit 60 is doubled, so that the phase difference becomes less. Typically, after five or six cycles of the synchronising signal, the two signals are exactly in phase.

After the last cycle of the synchronising signal has been received (which might be after eight or sixteen cycles) the monostable 72 will time out, so shutting gates 74 and 76. The gate 58 is hence locked into passing signals from output 56, and so the signal at the output terminal 62 remains at a constant frequency of 31.25 kHz. After the requisite number of cycles has been generated, which in this case is set at one hundred and sixty, the reset unit 80 provides a reset signal as described earlier, closing the gate 52 and terminating the generation of a signal at the output terminal 62. The circuit is then in a quiescent state until reactivated by receipt of the next synchronising reference signal; and in this quiescent state the current drain is very small since only the oscillator 50 is producing an output.

I claim:

1. A system for locating a transponder within a defined area, the system comprising a base station and two spaced-apart slave stations at known locations, the transponder and at least those slave stations remote from the base station each incorporating a means to receive signals transmitted from the base stations, an electronic flywheel circuit, and a means to bring the flywheel circuit into synchronism with the received signal from the base station, the signal from the base station being modulated at the frequency of the flywheel circuitry, the transponder also incorporating means to transmit a radio signal modulated at the frequency of the flywheel circuit at a predetermined time interval after receipt of the said signal from the base station, said time interval being set by reference to the flywheel circuit of the transponder, and each slave station incorporating means to receive the radio signal from the transponder and to determine by reference to the flywheel circuit of the respective slave station the time of receipt thereof, the system also including means to determine from the known locations of the base station and the two slave stations and from the times of receipt of the radio signal from the transponder the location of the transponder.

2. A system as claimed in claim 1 wherein those slave stations remote from the base station are arranged to determine the time of receipt of the radio signal from the transponder by measuring the phase difference between the radio signal from the transponder and an output signal from the respective flywheel circuit.

3. A system as claimed in claim 1 wherein there are more than two slave stations.

4. A system as claimed in claim 1 wherein one of the slave stations is incorporated in the base station, and comprises a means to receive signals transmitted from the base station, an electronic flywheel circuit, and a means to bring the flywheel circuit into synchronism with the received signal from the base station, means to receive the radio signal from the transponder, and means to determine by reference to the flywheel circuit of the said slave station the time of receipt of the radio signal.

5. A system as claimed in claim 1 wherein the flywheel circuit incorporates an oscillator and a divider network arranged to generate, from signals received from the oscillator, a lower frequency output signal, and the means to bring the flywheel circuit into synchronism with the received signal comprises means for detecting the phase difference between the received signal and the output signal, and for reducing the effective modulus of the divider network during a time period proportional to that phase difference.

6. A system as claimed in claim 5 wherein the synchronism means halves the modulus of the divider network during the said time period.

7. A system as claimed in claim 5 wherein the synchronism means doubles the frequency of signals supplied to the divider network during the said time period.

8. A transponder for use in a system for locating the transponder within a defined area, the system comprising a base station and two spaced-apart slave stations at known locations, at least those slave stations remote from the base station each incorporating a means to receive signals transmitted from the base station, an electronic flywheel circuit, and a means to bring the flywheel circuit into synchronism with the received signal from the base station, the signal from the base station being modulated at the frequency of the flywheel circuitry, each slave station incorporating means to receive a radio signal from the transponder and to determine by reference to the flywheel circuit of the respective slave station the time of receipt thereof, the system also including means to determine from the known locations of the base station and the two slave stations and from the times of receipt of the radio signal from the transponder the location of the transponder, each said flywheel circuit incorporating an oscillator and a divider network arranged to generate, from signals received from the oscillator, a lower frequency output signal, and said means to bring the flywheel circuit into synchronism with the received signal comprising means for detecting the phase difference between the received signal and the output signal, and for reducing the effective modulus of the divider network during a time period proportional to that phase difference, the transponder comprising a means to receive signal from the base station, a transponder electronic flywheel circuit, means to bring the transponder flywheel circuit into synchronism with the received signal from the base station, and means to transmit a radio signal at a predetermined time interval after receipt of the signal from the base station, said time interval being set by reference to the flywheel circuit of the transponder, wherein the transponder flywheel circuit incorporates an oscillator and a divider network arranged to generate, from signals received from the oscillator, a lower frequency output signal, and the means to bring the transponder flywheel circuit into synchronism with the received signal comprises means for detecting the phase difference between the received signal and the output signal, and for reducing the effective modulus of the divider network during a time period proportional to that phase difference.

* * * * *